(12) United States Patent
Fritsche et al.

(10) Patent No.: US 7,905,344 B2
(45) Date of Patent: Mar. 15, 2011

(54) METHOD FOR DEPOSITING A FREELY MOVING, FLAT OBJECT

(75) Inventors: Beat Fritsche, Greifensee (CH); Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 590 days.

(21) Appl. No.: 11/628,141

(22) PCT Filed: Jun. 29, 2006

(86) PCT No.: PCT/EP2006/006303
§ 371 (c)(1),
(2), (4) Date: Nov. 29, 2006

(87) PCT Pub. No.: WO2007/003335
PCT Pub. Date: Jan. 11, 2007

(65) Prior Publication Data
US 2008/0279670 A1 Nov. 13, 2008

(51) Int. Cl.
*B65G 17/36* (2006.01)
(52) U.S. Cl. .................. 198/704; 198/705; 209/900
(58) Field of Classification Search .................. 198/701, 198/703, 704, 705, 890, 369.7; 209/900, 209/908, 911
See application file for complete search history.

(56) References Cited

U.S. PATENT DOCUMENTS

| | | | |
|---|---|---|---|
| 3,573,748 A | 4/1971 | Holme | |
| 4,509,635 A * | 4/1985 | Emsley et al. | 198/704 |
| 5,109,987 A * | 5/1992 | Daboub et al. | 209/900 |
| 5,718,321 A * | 2/1998 | Brugger et al. | 198/359 |
| 6,068,109 A * | 5/2000 | Schuster | 198/704 |
| 6,523,675 B1 | 2/2003 | Romeder | |
| 7,343,219 B2 * | 3/2008 | Berdelle-Hilge | 209/584 |
| 7,464,822 B2 * | 12/2008 | Coffelt et al. | 209/900 |

FOREIGN PATENT DOCUMENTS

| | | |
|---|---|---|
| DE | 199 43 362 A1 | 3/2001 |
| EP | 1220721 B1 | 12/2004 |
| WO | 0119537 A1 | 3/2001 |

OTHER PUBLICATIONS

Derwent Abstract—DE-199 43 362 A1; Mar. 22, 2001; Siemens AG, D-80333 Muenchen, Germany.

* cited by examiner

*Primary Examiner* — James R Bidwell
(74) *Attorney, Agent, or Firm* — Laurence A. Greenberg; Werner H. Stemer; Ralph E. Locher

(57) ABSTRACT

In a method for depositing a flat object dropping freely into a lower compartment, a wall of the compartment at an angle in relation to a vertical is used as a flat deposit point for a flat side of the flat object. During passage of the flat object into the lower compartment an angular momentum is imparted to the flat object such that an angle of incidence between the wall and the flat side of the flat object is minimized.

15 Claims, 3 Drawing Sheets

METHOD FOR DEPOSITING A FREELY MOVING, FLAT OBJECT

BACKGROUND OF THE INVENTION

The present invention relates to a method for depositing a freely dropping, flat object and a suitable depositing device.

Flat objects, in particular mail items of different mass and surface area, are to be deposited individually from pockets in containers located below, with the pockets and containers moving at different speeds from each other. A speed can thereby also be zero. The objects are deposited aligned to one or two edges. This alignment is a requirement for further processing by machine and for sequence sorting and the associated subsequent manual handling by the mail operator.

If a freely dropping, flat object—the object will generally drop in its longest (flat) direction close to the vertical due to the force of gravity—has to be deposited into a lower compartment, wherein a wall that is at an angle in relation to the vertical is used as a flat deposit point for a flat side of the flat object, the following problems occur.

On the one hand the front (lower and thinner) edge of the mail item in relation to the drop direction may strike the angled wall such that the angle of incidence between the flat side of the mail item and the wall is too large. This can cause the mail item to be damaged or crushed. This effect increases even more, the larger the format or weight of the mail item. In the case of magazines with a large number of pages, some pages can for example suffer particular damage.

Unwanted but also generally unavoidable friction between the mail item and the wall must also be taken into account, as this can result in incorrect alignment of the mail item in the compartment. If the compartment becomes blocked by the mail item, this can result in dramatic situations for further mail items as they arrive.

DE 199 43 362 A1 sets out a facility and method for ordering flat mail items, which have a delivery sequence to allow the number of deposit points and control elements for sorting mail items to be reduced. A freely dropping, flat object will thereby drop in a direction close to the vertical due to the force of gravity and be deposited into a lower compartment, wherein a floor that is at an angle in relation to the vertical is used as a flat deposit point for a flat side of the flat object.

SUMMARY OF THE INVENTION

The object of the present invention is therefore to optimize a transfer of freely moving, flat objects into a lower, angled compartment.

Accordingly, one aspect involves a method for depositing a flat object dropping freely into a lower compartment, wherein a wall of the compartment at an angle in relation to a vertical is used as a flat deposit point for a flat side of the flat object. During passage of the flat object into the lower compartment an angular momentum is imparted to the flat object such that an angle of incidence between the wall and the flat side of the flat object is minimized.

Based on a method for depositing a freely moving, preferably freely dropping, flat object, e.g. from a first upper compartment, to a second lower compartment, whose one wall at an angle to the movement direction or the vertical is used as a flat deposit point for a flat side of the flat object, according to the invention an angular momentum is transmitted to the flat object as it passes through the second compartment, such that an angle of incidence between the wall and the flat side of the flat object is minimized.

The angular momentum can thereby be imparted for example in a simple mechanical manner, for example by means of a turning device, which nudges a non-central region of the flat side of a dropping mail item, such that the flat side undergoes an appropriate rotation in relation to the vertical. Other means can similarly be used, as clearly specified by the features of the depositing device described below.

The inventive method is advantageously not limited to flat mail items dropping freely in a vertical direction but could be used for mail items, whose "drop direction" is not vertical (in the sense of the force of gravity). In other words the angular momentum mentioned above could also be imparted to the mail item having an original non-vertical momentum before being deposited on a wall at an angle in relation to said momentum direction.

The intensity of the angular momentum to be imparted can be adjusted simply as a function of a moment of inertia of the flat mail item or its category (e.g. based on small, medium or large format) and geometric characteristics of the lower compartment.

The time of imparting the angular momentum should in any case be selected such that the lower edge of the freely dropping, flat object does not strike the angled wall abruptly. A further time criterion for imparting the angular momentum can also be used, in that the first (lower) half of the flat side of the mail item has already entered the second compartment.

The mail items are generally released from upper cassettes, suspended from a moving belt. In other words the mail items may have a horizontal movement component or angular momentum in addition to their vertical drop direction, due for example to a nudge to the upper region of the mail item at the opening of the circulating cassette. The invention therefore allows effective correction of the original movement characteristics of the dropping mail item during further passage into a lower, for example fixed, compartment with an angled wall.

BRIEF DESCRIPTION OF THE SEVERAL VIEWS OF THE DRAWINGS

The invention is described in more detail below by way of an example with reference to the drawing, in which.

DETAILED DESCRIPTION OF THE INVENTION

Figure 1:
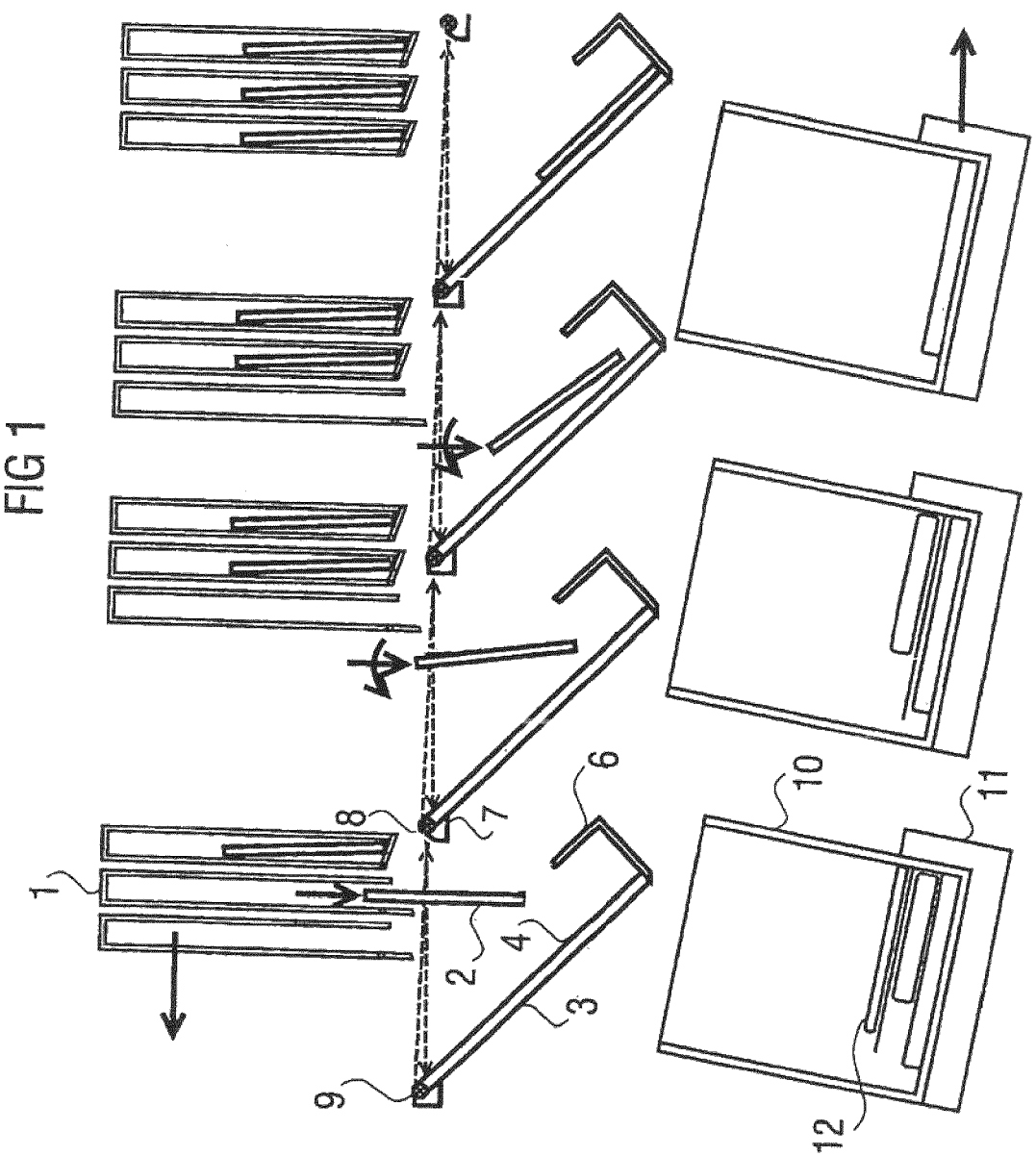
FIG. 1: shows the main method steps of the inventive depositing of a mail item in an angled container.

FIG. 1 shows four successive method steps (from left to right) of a flat mail item 2, in this instance dropping freely, into a lower compartment 3, whose wall 4, which is at an angle in relation to the vertical, is used as the intended deposit point for a flat side of the mail item 2.

For example the flat mail item 2 drops down from an upper cassette 1 aligned in a vertical manner in relation to the flat side, said cassette 1 being part of a moving belt—shown moving to the left here—with a number of coordinated, identical cassettes. The time of opening of a lower outlet of the cassette 1 can generally be transmitted to the moving belt by means of a stipulation to the cassette 1. Further control means, such as optical test signals, can control the time of this stipulation more precisely such that the cassette 1 is opened at specific time intervals or above the inlet region of the lower compartment 3. The lower compartment 3 can thereby also be part of a second moving belt below the first moving belt.

A flap 6 in the lower region of the compartment 3 is used as an alignment means for a lower—thin—edge of the mail item 2 or as a closing means for the compartment 3. When the flap 6 is opened, the mail item drops further down, e.g. into a third container 10, which can be similarly attached to a third moving belt—shown here moving in a right horizontal direction—by way of a slide 11. Stacks 12 of mail items, which were deposited into what are now "middle" compartments 3, are thus formed selectively in one of the third containers 10. The edge and flat side of the mail items are thereby aligned on the floor and side wall of the third container 10. Correct alignment of the stack 12 can also be achieved by way of particular positioning/movement of the circulating slide in relation to vertical or horizontal directions.

As far as the device aspect of the invention is concerned, as the flat mail item 2 passes into the lower compartment, a means 5—in this instance a rotating arm—imparts an angular momentum to the flat edge of the flat mail item 2, such that the angle of incidence between the angled wall 4 and the flat side of the mail item 2 is minimized. The rotating arm or turning device 5 has an axis of rotation, which is parallel to the angled wall 4 and where possible to the flat side. To simplify the device, in FIG. 1 the axis of rotation of the turning device 5 is shown above the identical axis of the flap 6. The upper lateral part of the rotating turning device 5 can have a curved or offset contact surface, by way of which the mail item 2 is nudged. The curve or kink allows better pressure distribution during the nudge, such that the mail item is not damaged. Similarly it ensures that the angular momentum is transmitted in a more effectively distributed manner over a region of the mail item. A number of coordinated rotating arms can also be mounted on an axis of rotation, thereby allowing different intensities of angular momentum to be imparted.

Figure 2:
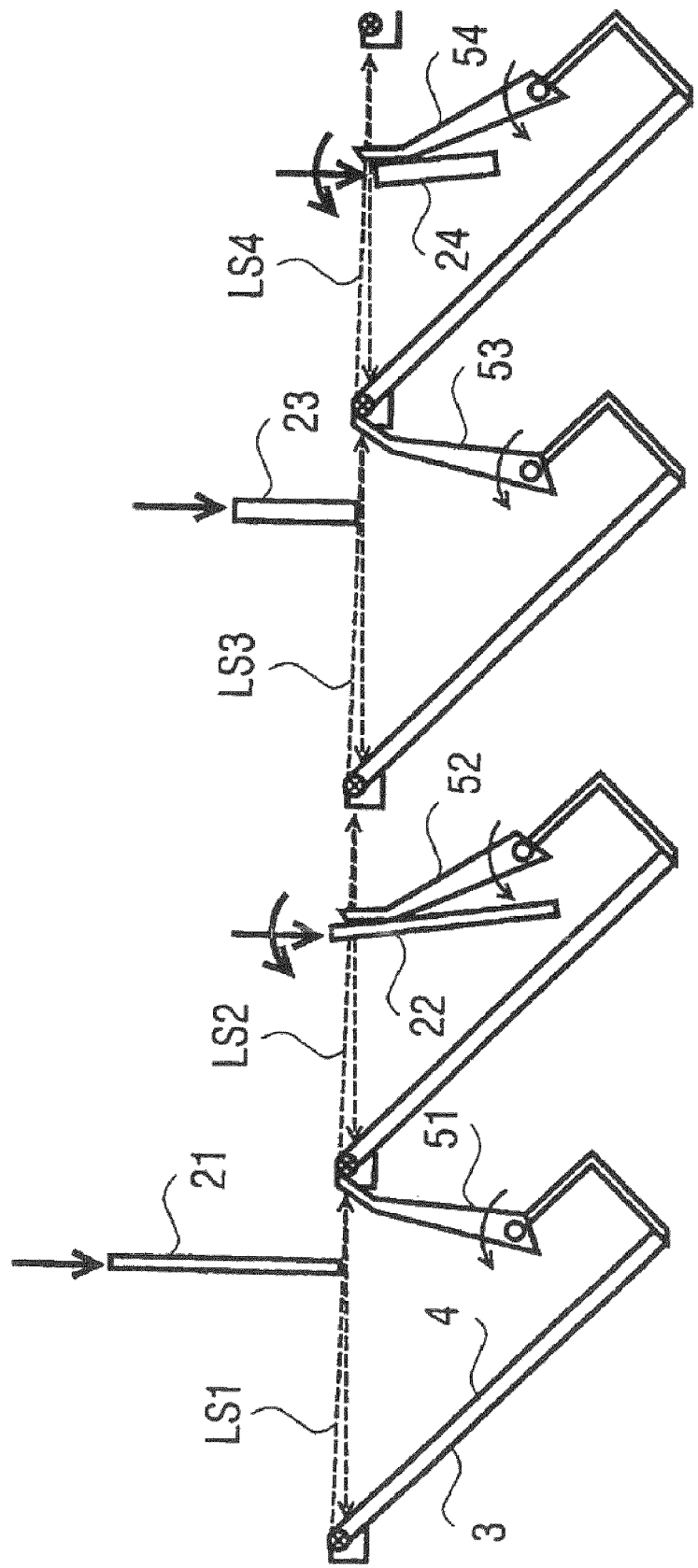
FIG. 2: shows the depositing of mail items of different formats.
Figure 3:
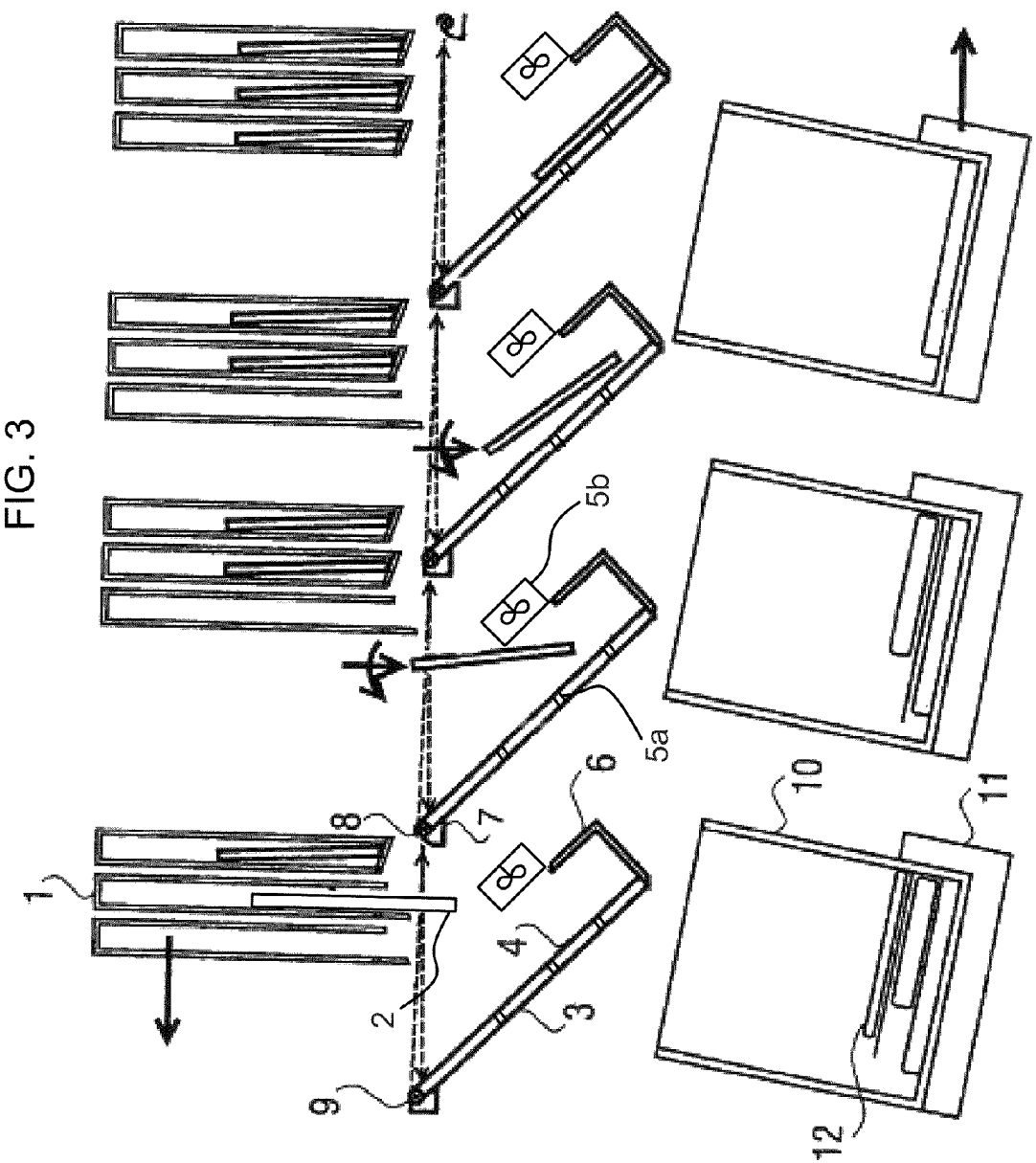
FIG. 3 shows the main method steps of another embodiment for depositing of a mail item in an angled container.

The first diagram on the left with the mail item 2 in FIG. 2 shows the transfer of the mail item from the cassette 1 to the lower compartment 3 and subsequent passage into the lower compartment 3. The rotating arm 5 is thereby held at a distance from the mail item. A light barrier with a light source 9 and a receiver 8 (or a mirror 8 to feed the light back to the light source 9, which in this instance has a receiver) generates a light beam in the upper entry region of the compartment 3. It is thus made known when the mail item 2 enters the compartment 3. The turning device 5 (see the diagram of the mail item 2 second from left) primarily comes into contact with the region of the upper half of the flat side of the mail item 2, before the edge of the mail item 2 that is lower in relation to the drop direction strikes the angled wall 4. This imparts the angular momentum to the mail item 2, such that the flat side of the mail item 2 tilts over the axis of rotation and approaches the angled wall 4, without an abrupt landing resulting between the two (see the diagram of the mail item 2 third from left). The last diagram on the right shows the end position of the mail item 2 on the angled wall 4, which should also be the position where the mail item 2 strikes the angled wall 4.

FIG. 1 shows a rotating arm 5 with a contact surface as the means for imparting the angular momentum to the mail item 2. However many other means are also possible:

the contact surface could be part of a movable nudging element instead of the rotating arm, said element nudging part of the upper half of the flat mail item 2 in a laterally horizontal manner in the exemplary embodiment according to FIG. 1 and after passage of the lower half of the mail item. The contact surface could optionally also be a cylinder barrel of a tire, which changes the drop direction of the mail item 2 by means of a rotation induced by friction with the flat side of the mail item 2 and adjusts it to the angled wall 4. The tire could similarly be mounted on the rotating arm or the movable element by means of an axis of rotation there and be used as a rotating contact surface.

a contactless attractor and/or a contactless repeller could similarly be used instead of the rotating arm 5. The attractor and repeller could thereby be a suction device 5a and a fan 5b. For example the fan could generate a flow of air from the upper region to the lower region of the lower region of the lower compartment. A flow of air along and in proximity to the flat angled wall 4 could similarly be used as a rotating means but the mail item would then only rest on the wall 4, when said flow of air was deactivated, which is not ideal for speed reasons in contrast to mechanical contact means.

an alternative could be achieved by using electrostatically charged elements as the attractor and repeller. The flat, angled wall 4 and a point opposite the compartment 3 could be connected to positively or negatively charged voltages. Flat paper or plastic mail items for example could thus be aligned by attraction to positive charges in the direction of the angled parts (in other words the wall 4) of the compartment 3. However a further passage from the compartment 3 to a lower container 10 could be problematic, as with the flap 6 open and with residual electrostatic charges in the compartment 3 the mail item 2 might be prevented from sliding downward. The attraction and repulsion forces to be generated in this process are also a function of the characteristics (material, format, weight) of the mail items, so this solution is more complex to set up than the previous ones.

FIG. 2 shows two instances where angular momentum is imparted as mail items of different formats are deposited. Both mail items 21, 22 shown on the left are identical and have a longish flat side. Both mail items 23, 24 shown on the right are similarly identical and have a shorter flat side (and a larger thickness at the lower edge) than the first two mail items 21, 22. In both instances at least the passage of a mail item into the upper region of the compartment 3 is monitored using a light barrier LS1, LS2, LS3, LS4.

Before the passage of the first longish mail item 21 across the first light barrier LS1 the rotating arm 51 remains in a restraint position, such that the upper entry of the compartment 3 is funnel-shaped for wider receipt of the mail item.

Because of its long side and so that the mail item does not strike the angled wall 4 abruptly or in a frictional manner, the first mail item 21 must be tilted before passing fully across the light barrier LS1. This situation is shown for the second longish mail item 22, the upper part of which is still within the light barrier LS2, when the rotating arm 52, which is in a position to impart the angular momentum, nudges the mail item 22. As a criterion for "preventive" activation of the rotating arm 51, 52 the dimensions of the compartment 3 are taken into account in conjunction with the typical maximum lengths of flat mail items. If the light barrier LS1, LS2 remains masked for a threshold period, a longish mail item is identified and the imparting of the angular momentum is activated early enough it strikes the angled wall 4. The rotating arm 51, 52 thereby nudges the upper half of the flat side of the mail items 21, 22.

In addition to the individual light barrier shown, further light barriers could also be used, for example in the region between the cassette 1 and the entry of the lower compartment 3. This is more complex but it provides more accurate information about the position and format of the freely dropping mail items. Mail item formats can however be determined in a preliminary method and are then available for the transfer. The light barriers can thereby be used as triggers and the time for imparting the angular momentum is defined according to known mail item parameters, having been optimized empirically in a test phase.

The diagrams further to the right for both mail items 23, 24 with shorter flat sides show, as in the two first diagrams on the left, the passage of the lower part of the mail item 23 across the light barrier LS3 and the subsequent exit of the upper part of the same mail item 24. The flat side of the mail item 23, 24 is thereby small enough that the deactivated and reactivated optical signal of the light barrier LS3, LS4 controls activation of the rotating arm without any risk of the angled wall 4 being struck and without stipulation of a threshold period. The angular momentum is therefore triggered autonomously and transmitted to the mail item.

The invention claimed is:

1. A method for depositing a flat object dropping freely into a lower compartment, according to which a wall of the compartment at an angle in relation to a vertical is used as a flat deposit point for a flat side of the flat object, wherein during passage of the flat object into the lower compartment, an angular momentum is imparted to the flat object, such that an angle of incidence between the wall and the flat side of the flat object is minimized.

2. The method of claim 1, characterized in that the intensity of the angular momentum is adjusted as a function of a moment of inertia of the flat object and geometric characteristics of the lower compartment.

3. The method of claim 1, characterized in that the time of imparting the angular momentum is selected such, before a lower edge of the freely dropping, flat object strikes the angled wall.

4. The method of claim 1, wherein the imparting of the angular momentum is controlled by means of optical control signals.

5. The method of claim 1, wherein the object drops down from an upper cassette aligned vertically in relation to the flat side, said cassette being part of a moving belt, the lower compartment is part of a second moving belt below the first moving belt, the mail item drops further down into a third container, which is attached to a third moving belt.

6. A depositing device for a flat object dropping freely into a lower compartment, the lower compartment having a wall that is at an angle in relation to a vertical as the flat deposit point for a flat side of the flat object, wherein during passage of the flat object into the lower compartment a means produces an angular momentum on a flat side of the flat object, such that an angle of incidence between the angled wall and the flat side of the flat object is minimized.

7. The depositing device of claim 6, wherein the means has a contact surface, which nudges the region of the upper half of the flat side of the flat object, before the flat object strikes the wall.

8. The depositing device of claim 7, wherein the contact surface is part of a rotatable arm.

9. The depositing device of claim 7, wherein the contact surface is part of a movable nudging element.

10. The depositing device of claim 6, wherein the means is at least one of a contactless attractor and repeller.

11. The depositing device of claim 10, wherein the attractor and repeller are a suction device and a fan.

12. The depositing device of claim 11, wherein the fan generates a flow of air from an upper region to a lower region of the lower compartment.

13. The depositing device of claim 10, wherein the attractor and repeller are electrostatically charged elements.

14. The depositing device of claim 6, wherein a passage in an upper region of the compartment has one or more light barriers.

15. The depositing device of claim 6, wherein a passage in an upper region of the compartment is funnel-shaped.

* * * * *